United States Patent
Hinoshita et al.

(10) Patent No.: US 9,057,816 B2
(45) Date of Patent: Jun. 16, 2015

(54) RESIN-COATED OPTICAL FIBER

(75) Inventors: Shinji Hinoshita, Hitachi (JP); Tetsuya Sukegawa, Hitachi (JP); Tomokazu Hiyama, Hitachi (JP); Shigeto Kobayashi, Kitaibaraki (JP); Natsuki Kamiya, Hitachi (JP); Bing Yao, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 294 days.

(21) Appl. No.: 13/241,447

(22) Filed: Sep. 23, 2011

(65) Prior Publication Data
US 2012/0163759 A1 Jun. 28, 2012

(30) Foreign Application Priority Data

Dec. 27, 2010 (JP) .................. 2010-290658

(51) Int. Cl.
*G02B 6/02* (2006.01)
*G02B 6/44* (2006.01)
*C03C 25/10* (2006.01)
*G02B 6/028* (2006.01)

(52) U.S. Cl.
CPC ............ *G02B 6/02395* (2013.01); *G02B 6/443* (2013.01); *G02B 6/0238* (2013.01); *C03C 25/1065* (2013.01); *G02B 6/4402* (2013.01); *G02B 6/0288* (2013.01)

(58) Field of Classification Search
CPC .. G02B 6/02; G02B 6/02395; G02B 6/02038; G02B 6/0288; G02B 6/4402; G02B 6/443; C03C 25/1065
USPC .......... 385/128, 141; 264/406; 427/8; 65/385
See application file for complete search history.

(56) References Cited

U.S. PATENT DOCUMENTS 4,173,393 A * 11/1979 Maurer .......................... 385/142
4,448,484 A * 5/1984 Lombardi et al. ............. 385/128
4,629,286 A * 12/1986 Fuse et al. ..................... 385/128

(Continued)

FOREIGN PATENT DOCUMENTS

JP    2001-083381 A    3/2001
JP    2003-095706 A    4/2003

OTHER PUBLICATIONS

Bai, Ruixiang & Yan, Cheng (2007) Effects of surface cracks and coating on fracture behaviour of microstructured silica optical fibers. In Fifth Australasian Congress on Applied Mechanics (ACAM 2007), Dec. 10-12, 2007, Brisbane, Australia.*

*Primary Examiner* — Peter Radkowski
(74) *Attorney, Agent, or Firm* — Paul D. Bianco; Martin Fleit; Fleit Gibbons Gutman Bongini & Bianco PL

(57) ABSTRACT

The invention provides a resin-coated optical fiber, including at least: a glass optical fiber composed of a core and a clad for coating the core; a primary layer made of UV-curing resin in contact with the glass optical fiber; and a secondary layer made of the UV-curing resin disposed on an outer periphery of the primary layer, wherein the primary layer has a two-layer structure of an inner layer in contact with a surface of the clad, and an outer layer for coating the inner layer, wherein the UV-curing resin of the inner layer has a Young's modulus of 0.9 MPa or more and 3.0 MPa or less at room temperature in a film state based on JIS standard K7113, and the UV-curing resin of the outer layer has a Young's modulus of 0.1 MPa or more and 0.7 MPa or less at room temperature in a film state based on JIS standard K7113.

8 Claims, 8 Drawing Sheets

(56) References Cited

U.S. PATENT DOCUMENTS

| | | | |
|---|---|---|---|
| 5,139,872 A * | 8/1992 | Lapin et al. | 428/375 |
| 5,182,786 A * | 1/1993 | Kinaga et al. | 385/128 |
| 5,402,516 A * | 3/1995 | Blyler et al. | 385/141 |
| 5,644,670 A * | 7/1997 | Fukuda et al. | 385/124 |
| 5,729,646 A * | 3/1998 | Miyagi et al. | 385/125 |
| 5,748,826 A * | 5/1998 | Nagano et al. | 385/128 |
| 6,888,991 B2 * | 5/2005 | White | 385/123 |
| 6,904,210 B2 * | 6/2005 | Chandraiah et al. | 385/114 |
| 7,130,516 B2 * | 10/2006 | Wu et al. | 385/128 |
| 2004/0052483 A1 * | 3/2004 | Chandraiah et al. | 385/114 |
| 2008/0233397 A1 * | 9/2008 | Cattron et al. | 428/392 |
| 2011/0274396 A1 * | 11/2011 | Nakajima et al. | 385/114 |

* cited by examiner

RESIN-COATED OPTICAL FIBER

The present application is based on Japanese Patent Applications No. 2010-290658 filed on Dec. 27, 2010, and the entire contents of which are hereby incorporated by reference.

BACKGROUND OF THE INVENTION

1. Field of the Invention

The present invention relates to a resin-coated optical fiber, with glass optical fiber coated with UV-curing resin.

2. Description of the Related Art

As shown in FIG. 10A, conventionally known resin-coated optical fiber is a resin-coated optical fiber 200 with a two-layer resin structure in which an outer periphery of a glass optical fiber 201 composed of a core 211 and a clad 212, is sequentially coated with a primary layer 202 with low Young's modulus, and a secondary layer 203 with high Young's modulus, which are made of UV-curing resin (described as UV-resin hereafter) (for example, see patent document 1). The primary layer 202 in contact with the glass optical fiber 201 is a soft UV-resin layer with Young's modulus of about 0.1 MPa to 1.5 MPa, and the secondary layer 203 is a UV-resin layer with a hard shell structure with Young's modulus of about 600 MPa to 2000 MPa. With such a two-layer resin structure of the primary layer 202 and the secondary layer 203 with different Young's modulus, shock of an external stress such as a lateral pressure added to the glass optical fiber 201 is relaxed and absorbed when the resin-coated optical fiber 200 is bent, to thereby suppress an increase of a transmission loss such as a micro bending loss of the optical fiber.

Further, patent document 2 discloses a method of adding a silane coupling agent to the primary layer 202 in contact with the glass optical fiber 201 for suppressing a progress rate of glass corrosion caused by OH-group on the surface of the glass optical fiber 201. The silane coupling agent is brought into a dehydration condensation by metalloxane bond or silanol bond with the OH-group on the surface of the glass optical fiber 201, thereby suppressing the progress of the glass corrosion by reducing the OH-group.

[Patent Document 1]
Japanese Patent Laid Open Publication No. 2001-83381
[Patent Document 2]
Japanese Patent Laid Open Publication No. 2003-95706

However, in the resin coated optical fiber with the aforementioned two-layer resin structure, suppressing an increase of the transmission loss such as micro bending loss of the glass optical fiber by relaxing and absorbing the external stress, and realizing a long-term reliability by maintaining a fracture strength of the glass optical fiber for a long time, are difficult to be compatible with each other, even if Young's modulus of the UV-curing resin of the primary layer 202 and the secondary layer 203 is variously changed.

BRIEF SUMMARY OF THE INVENTION

Therefore, an object of the present invention is to provide a resin coated optical fiber capable of suppressing an increase of a transmission loss such as micro bending loss caused by an external stress, and excellent in long-term reliability by suppressing a fracture of a glass optical fiber.

According to a first aspect of the present invention, there is provided a resin coated optical fiber, comprising at least:

a glass optical fiber composed of a core and a clad for coating the core;

a primary layer made of UV-curing resin in contact with the glass optical fiber; and a secondary layer made of the UV-curing resin disposed on an outer periphery of the primary layer, wherein the primary layer has a two-layer structure of an inner layer in contact with a surface of the clad, and an outer layer for coating the inner layer, wherein the UV-curing resin of the inner layer has Young's modulus of 0.9 MPa or more and 3.0 MPa or less at room temperature in a film state based on JIS standard K7113, and the UV-curing resin of the outer layer has Young's modulus of 0.1 MPa or more and 0.7 MPa or less at room temperature in a film state based on JIS standard K7113.

DETAILED DESCRIPTION OF THE INVENTION

A resin coated optical fiber is manufactured by coating a glass optical fiber with UV-curing resin (UV-resin), the glass fiber being formed by heating and drawing a base material of a glass optical fiber (preform). In this manufacturing step, the glass optical fiber is cooled to a room temperature from a high temperature, and therefore minute roughness is generated on a clad surface of the glass optical fiber. When such a roughness is observed by an Atomic Force Microscope (AFM), it is found that an average roughness after drawing is usually 0.5 nm or less.

Figure 10A:
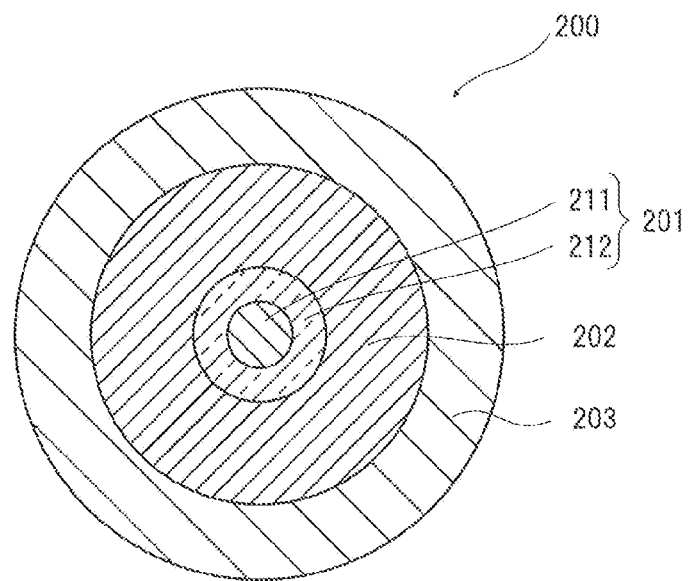
FIG. 10A is a cross-sectional view of a conventional resin coated optical fiber.
Figure 10B:
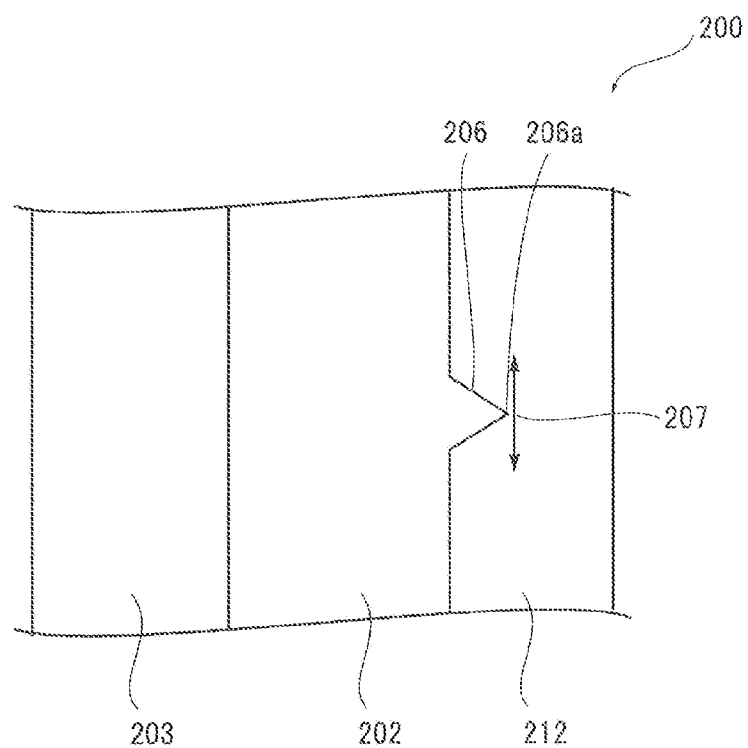
FIG. 10B is a vertical, sectional view showing a part of the conventional resin coated optical fiber.

FIG. 10B shows a recess portion 206, being one of the roughness generated on the surface of a clad 212, in a conventional resin coated optical fiber 200 having a two-layer resin structure composed of a primary layer 202 with low Young's modulus and a secondary layer 203 with high Young's modulus. According to FIG. 10A and FIG. 10B, it is found that the primary layer 202 that is brought into contact with the clad 212 on the surface of the glass optical fiber 201, is adsorbed on the surface of the clad 212 including the recess portion 206, to thereby suppress the reduction of a fracture strength of the glass optical fiber 201.

Incidentally, it is found that in order to relax an external stress such as a lateral pressure added to the glass optical fiber 201, and suppress micro bending loss, etc., to be small, it is effective to set the Young's modulus of the primary layer 202 to be small, to about 0.1 MPa to 0.8 MPa.

However, when the Young's modulus of the primary layer 202 is set to be small to about 0.1 MPa to 0.8 MPa, it is found that a great stress (concentrated stress) 207 is generated in a bottom portion 206a of the recess portion 206, without relaxing the concentration of the stress generated in the bottom portion 206a of the recess portion 206 caused by the external stress, because the Young's modulus of the primary layer 202 is too small. Owing to such a great stress, fracture of the glass optical fiber 201 is accelerated, and the recess portion 206 is expanded. In addition, a corrosion rate caused by OH-group on the surface of the glass optical fiber 201 becomes faster, with an increase of the stress 207 added to the bottom portion 206a of the recess portion 206, thus further expanding the recess portion 206. Accordingly, in the conventional resin coated optical fiber 200 with two-layer resin structure, the recess portion 206 is expanded with elapse of time, and the fracture strength of the glass optical fiber 201 is reduced, resulting in low long-term reliability.

The present invention focuses on the stress concentration added to the recess portion on the surface of the glass optical fiber, to relax and reduce the stress concentration.

Figure 1A:
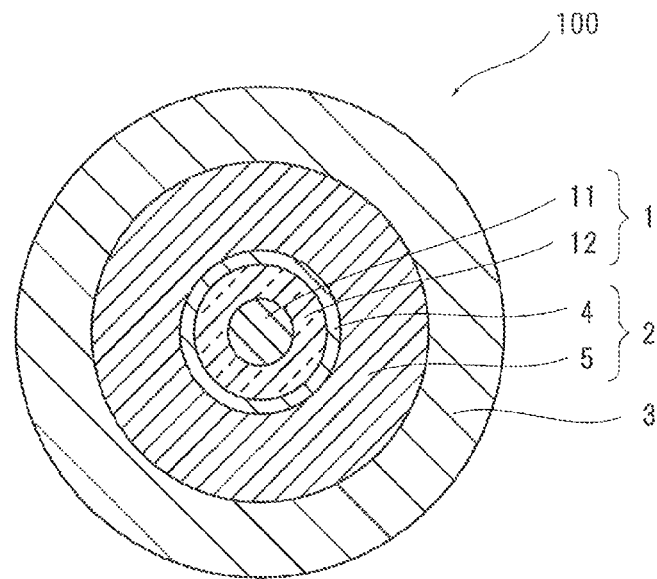
FIG. 1A is a cross-sectional view of a resin coated optical fiber according to an embodiment of the present invention.
Figure 1B:
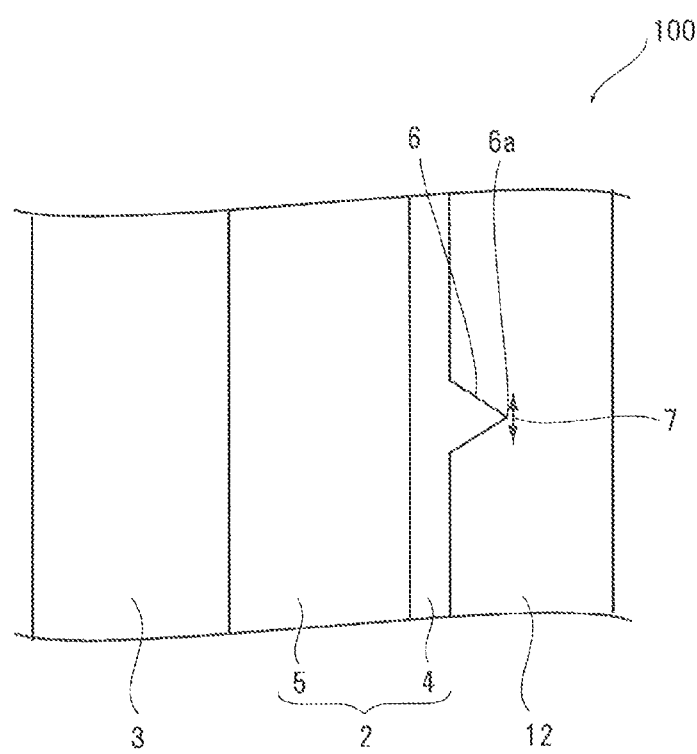
FIG. 1B is a vertical sectional view showing a part of the resin coated optical fiber according to an embodiment of the present invention.

The resin coated optical fiber according to an embodiment of the present invention will be described hereafter, by using the drawings. FIG. 1A is a cross-sectional view of the resin coated optical fiber according to an embodiment of the present invention, and FIG. 1B is a vertical sectional view showing a part of the resin coated optical fiber according to an embodiment of the present invention.

[Resin Coated Optical Fiber]

As shown in FIG. 1A, in a resin coated optical fiber 100 according to this embodiment, a primary layer 2 and a secondary layer 3 made of UV-resin are sequentially applied on the surface of a glass optical fiber 1 composed of a core 11 and a clad 12 for coating the core 11. The primary layer 2 is a soft UV-resin layer with low Young's modulus, and the secondary layer 3 is a UV-resin layer with a hard shell structure with high Young's modulus. The primary layer 2 of this embodiment has a two-layer structure of an inner layer 4 in contact with a clad 12 on the surface of the glass optical fiber 1, and an outer layer 5 for coating the inner layer 4. Namely, the UV-resin layer of the outer periphery of the glass optical fiber 1 according to this embodiment, has a three-layer structure of the inner layer 4 of the primary layer 2, the outer layer 5 of the primary layer 2, and the secondary layer 3. Then, the Young's modulus of the UV-resin of the inner layer 4 is higher than the Young's modulus of the UV-resin of the outer layer 5.

The core 11 and the clad 12 are formed in the glass optical fiber 1, the core 11 being in a high refractive index region mainly composed of synthetic silica glass for example and added with Ge (germanium) and F (fluorine), and the clad 12 being in a low refractive index region composed of a silica glass simple body and added with F (fluorine). In the present invention, the structure of the glass optical fiber 1 is not particularly limited, and the glass optical fiber 1 may be either one of a single mode fiber and a multi mode fiber.

As described above, the glass optical fiber 1 formed by heating and drawing the preform is cooled to a room temperature from a high temperature, and therefore minute roughness exists on the surface of the clad 12 of the glass optical fiber 1. FIG. 1B shows one recess portion 6 out of the roughness generated on the surface of the clad 12 in the resin coated optical fiber 100 of this embodiment with a three-layer resin coated structure. The inner layer 4 of the primary layer 2 which is brought into contact with the clad 12 of the glass optical fiber 1, is adsorbed on the surface of the clad 12 having roughness, to thereby suppress a reduction of the fracture strength of the glass optical fiber 1. Further, a silane coupling agent is added to the UV-resin of the inner layer 4. The silane coupling agent added to the inner layer 4 is brought into a dehydration condensation by metalloxane bond or silanol bond with the OH-group on the surface of the clad 12, thereby suppressing the progress of the glass corrosion by reducing the OH-group. Note that the kind of the silane coupling agent is not particularly limited.

UV-resin coating of the resin coated optical fiber 100 of this embodiment has a three-layer resin coated structure of the primary layer 2 made of soft UV-resin having a two-layer structure of the outer layer 5 and the inner layer 4 provided inside of the outer layer 5 in contact with the glass optical fiber 1, and the secondary layer 3 on the outer periphery of the primary layer 2 with a shell structure and made of the UV-resin harder than the primary layer 2. Wherein, the UV-resin of the inner layer 4 in contact with the surface of the glass optical fiber 1, has Young's modulus of 0.9 MPa or more and 3.0 MPa or less at room temperature (simply called Young's modulus at room temperature), and the UV-resin of the outer layer 5 of the primary layer 2 has Young's modulus of 0.1 MPa or more and 0.7 MPa or less at room temperature, in a film state based on JIS standard K7113. Namely, the inner layer 4 in contact with the surface of the glass optical fiber 1 is the UV-resin layer with higher Young's modulus than Young's modulus of the outer layer 5.

In this structure, first, a stress from outside added to the resin coated optical fiber 100 is received, relaxed, and absorbed by the secondary layer 3 which has a shell structure, and further an external stress added to the glass optical fiber 1 from the secondary layer 3 is relaxed and absorbed by the soft primary layer 2, to thereby reduce the external stress added to the glass optical fiber 1. Therefore, the transmission loss such as a micro bending loss caused by bending of the resin coated optical fiber 100, and increase of transmission loss by cabling caused by using the resin coated optical fiber 100 for a cable, can be suppressed to be small.

Further, the Young's modulus of the inner layer 4 of the primary layer 2 is set to be higher than the outer layer 5 thereof, and the surface of the glass optical fiber 1 is covered with the inner layer 4 with higher Young's modulus. Therefore, a stress concentration generated on the surface of the glass optical fiber 1, and particularly in a bottom portion 6a of the recess portion 6 can be dispersed or relaxed, and the stress (concentrated stress) 7 of the bottom portion 6a of the recess portion 6 can be reduced, compared with a conventional resin coated optical fiber with a two-layer resin coated structure as shown in FIG. 10B. Therefore, the fracture of the glass optical fiber 1 caused by the stress 7 can be suppressed, and the corrosion rate corresponding to a magnitude of the stress 7 can be suppressed to be low, the corrosion rate being accelerated by the OH-group on the surface of the glass optical fiber 1. Then the fracture strength of the glass optical fiber 1 can be maintained for a long time, and the long-term reliability of the resin coated optical fiber 100 can be improved.

Namely, in the resin coated optical fiber 100 of this embodiment, contradictory technical problems such as the reduction of the long-term reliability caused by low Young's modulus of the UV-resin layer in the primary layer 2, and the increase of the transmission loss such as micro bending loss caused by high Young's modulus of the UV-resin layer in the primary layer 2, can be simultaneously solved, by using the primary layer 2 with a two-layer structure of the inner layer 4 and the outer layer 5.

The Young's modulus at room temperature of the UV-resin of the inner layer 4 in contact with the surface of the glass optical fiber 1 is set in the aforementioned range. This is because when the Young's modulus at room temperature is smaller than 0.9 MPa, the concentration of the stress 7 of the recess portion 6 can not be sufficiently reduced, thus making it difficult to suppress the fracture and corrosion of the glass optical fiber 1, and the long-term reliability of the glass optical fiber 1 can not be realized (see FIG. 7 and FIG. 8 of an example as will be described later). Meanwhile, when the Young's modulus at room temperature of the UV-resin of the inner layer 4 is larger than 3.0 MPa, although the concentration of the external stress added to the recess portion 6 can be reduced, the external stress transmitted to the glass optical fiber 1 can not be sufficiently relaxed, and the increase of transmission loss by cabling and the micro bending loss can not be suppressed to be small. The Young's modulus at room temperature in a film state based on the JIS standard K7113 is obtained by pulling the UV-resin film by a tensile tester and is measured from a stretch at this time and a variation rate of the stress.

Further, the Young's modulus at room temperature of the UV-resin of the outer layer 5 in the primary layer 2 is set in the aforementioned range. This is because when the Young's modulus at room temperature is larger than 0.7 MPa, the external stress transmitted to the glass optical fiber 1 can not be sufficiently relaxed, and the micro bending loss and the increase of transmission loss by cabling can not be suppressed to be small (see FIG. 3 and FIG. 4 of an example). Meanwhile, this is because when the Young's modulus at room temperature of the UV-resin of the outer layer 5 is smaller than 0.1 MPa, a mechanical strength required for manufacture and actual use of the optical fiber can not be sufficiently obtained.

In this embodiment, the Young's modulus of the UV-resin of the secondary layer 3 at room temperature is preferably 600 MPa or more and 2000 MPa or less. This is because when the Young's modulus of the secondary layer 3 at room temperature is smaller than 600 MPa, the shell structure of the secondary layer 3 is not sufficiently formed, and relaxing and absorption by the secondary layer 3 is not sufficiently exhibited. Further, this is because when the Young's modulus at room temperature of the secondary layer 3 is larger than 2000 MPa, the secondary layer 3 has less flexibility as the optical fiber, due to excessively high rigidity.

The kinds of the UV-resin used for the primary layer 2 composed of the inner layer 4 and the outer layer 5, and the secondary layer 3 are not particularly limited. However, urethane acrylic UV-curing resin is preferable, from a point of photo-curable property and good handleability. Note that the Young's modulus (Young's modulus at room temperature) of the UV-resin can be suitably adjusted by varying a molecular amount of oligomer components and blending amount of monomer components in the UV resin.

As an example of a dimension of each part of the resin coated optical fiber 100 of this embodiment, an outer diameter of the glass optical fiber 1 is 125 μm, an outer diameter of the primary layer 2 (inner layer 4 and outer layer 5) is 180 μm or more and 210 μm or less, and an outer diameter of the secondary layer 3 is 250 μm. A thickness of the inner layer 4 of the primary layer 2 is preferably set to be larger than a depth of the recess portion 6, so that the roughness on the surface of the clad 12 is covered and the recess portion 6 is filled with the UV-resin, so that the aforementioned stress concentration can be absorbed. Further, the thickness of the inner layer 4 is preferably smaller as much as possible, provided that it is larger than the depth of the recess portion 6, and is preferably 10 μm or less.

In the aforementioned embodiment, explanation is given for the resin coated optical fiber with a three-layer structure of the primary layer having two layers and the secondary layer. However, the present invention is not limited to this embodiment. For example, a structure of four-layers or more is also acceptable, in which a resin layer with different Young's modulus from the Young's modulus of the secondary layer is interposed between the primary layer and the secondary layer, or is arranged on the outer periphery of the secondary layer so as to coat the secondary layer.

Next, explanation will be given for a manufacturing method of manufacturing the resin coated optical fiber 100 according to this embodiment by using a drawing device shown in FIG. 2. The manufacturing method of the resin coated optical fiber 100 according to this embodiment comprises the steps of: drawing the glass optical fiber 1; forming the primary layer 2 composed of the inner layer 4 and the outer layer 5 on the surface of the glass optical fiber 1; and forming the secondary layer 3 on the surface of the outer layer 5.

Figure 2:
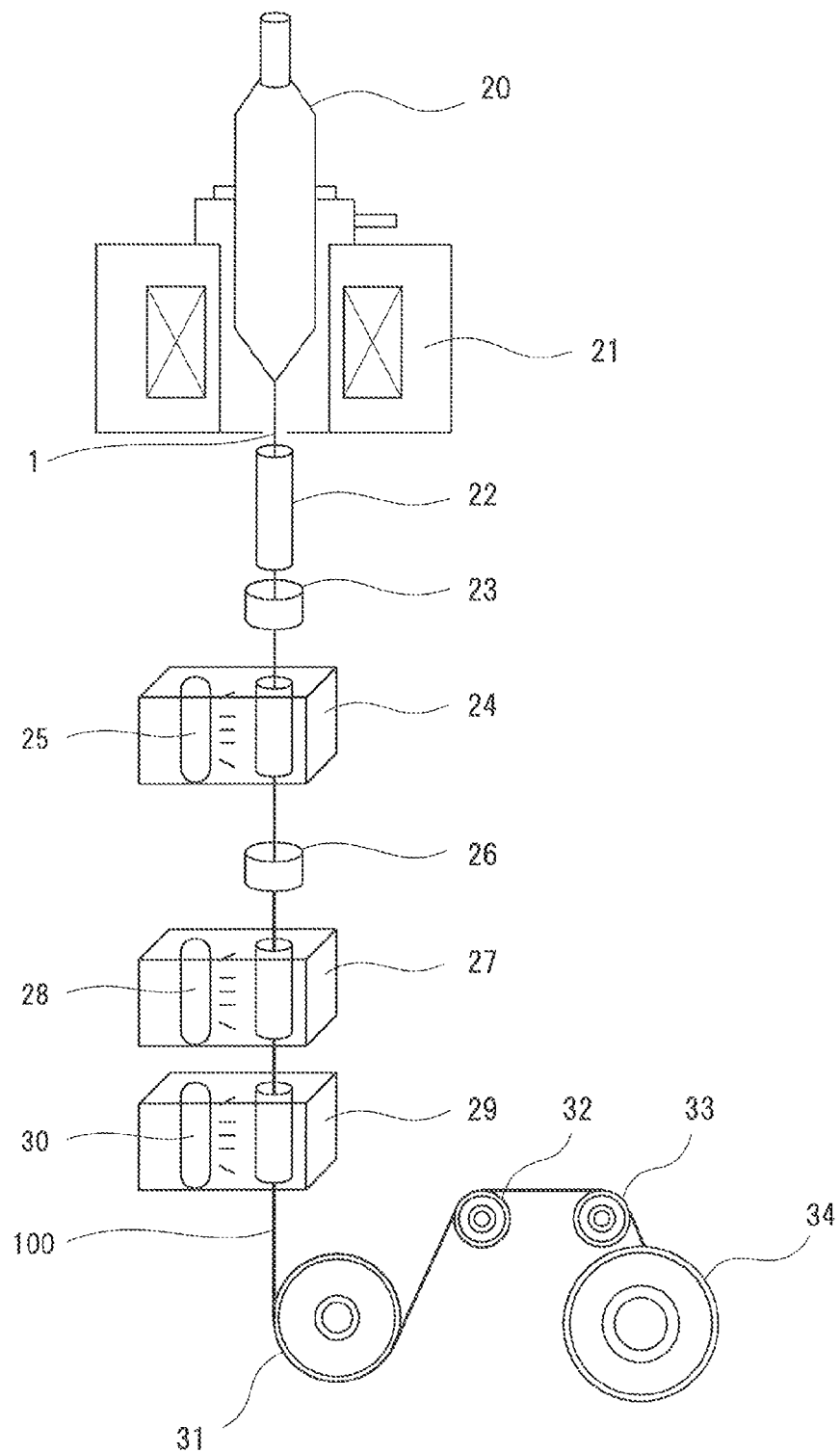
FIG. 2 is a schematic block diagram showing an example of a manufacturing device for manufacturing the resin coated optical fiber according to an embodiment of the present invention.

First, as shown in FIG. 2, the glass optical fiber 1 with an outer diameter of 125 μm is formed by heating and melting a preform 20 which is composed of a core and a clad using a drawing furnace 21, and drawing the preform 20 at a constant speed. Then, the formed glass optical fiber 1 is passed through a cooling dome 22, so as to be cooled to a room temperature. In this cooling, minute roughness is formed on the clad of the surface of the glass optical fiber 1.

Subsequently, the cooled glass optical fiber 1 is coated with UV-resin liquid for inner layer and UV-resin liquid for outer layer by Wet-On-Wet method (method of repeatedly applying next UV-resin liquid on the glass optical fiber 1 in a wet state of the UV-resin liquid which is first applied on the glass optical fiber 1). Thereafter, both resin liquids are irradiated with ultraviolet ray and are photo-cured together, to thereby form the inner layer 4 and the outer layer 5. Wet-On-Wet die 23 is a die with UV-resin coating cups provided to upper and lower two stages together, wherein the UV-resin liquid for inner layer with prescribed Young's modulus added with a silane coupling agent is supplied to the upper UV-resin coating cup, and the UV-resin liquid for outer layer with prescribed Young's modulus is supplied to the lower UV-resin coating cup. By pass of the glass optical fiber 1 through the Wet-On-Wet die 23, the UV-resin liquid for inner layer and the UV-resin liquid for outer layer are respectively repeatedly applied on the surface of the glass optical fiber 1 in a prescribed thickness. Then, the UV-resin liquid for inner layer and the UV-resin liquid for outer layer are photo-cured together by an UV irradiation device 24 having a UV lamp 25, to thereby simultaneously form the inner layer 4 and the outer layer 5 of the primary layer 2. According to the Wet-On-Wet method, the inner layer 4 and the outer layer 5 can be formed together. Therefore, the number of steps can be reduced, and a length of the coating device (composed of die and UV irradiation device) of the inner layer 4 can be reduced, and application to a conventional drawing device can be enabled by a slight modification. Further, the UV-resin liquid for inner layer can be applied so as to be thin, compared with a case that the inner layer 4 and the outer layer 5 are separately formed by coating and photo-curing each layer, thus making it possible to form a thin inner layer 4.

Subsequently, the glass optical fiber 1 in which the inner layer 4 and the outer layer 5 of the primary layer 2 are formed, is introduced into a die 26 and is coated with the UV-resin liquid for secondary layer. Thereafter, the coated UV-resin liquid for secondary layer is photo-cured by a UV irradiation device 27 having a UV lamp 28 and a UV irradiation device 29 having a UV lamp 30 which are provided to upper and lower two stages, and the secondary layer 3 is formed on the primary layer 2, to thereby obtain the resin coated optical fiber 100 according to this embodiment. Thereafter, the formed resin coated optical fiber 100 is diverted by turn pulleys 31, 32, 33 respectively, and is wound on a bobbin 34.

Note that according to this embodiment, the inner layer 4 and the outer layer 5 are formed together by the Wet-On-Wet method. However, the inner layer 4 and the outer layer 5 may also be formed layer by layer. Further, three layers of the inner layer 4, the outer layer 5, and the secondary layer 3 can also be formed together by the Wet-On-Wet method.

EXAMPLES

Next, examples of the present invention will be specifically described. The resin coated optical fiber of an example has a structure similar to the structure of the resin coated optical fiber 100 of the aforementioned embodiment shown in FIG. 1A.

Example 1

In example 1, first, a glass optical fiber with an outer diameter of 125 μm was formed by heating and drawing a preform, being a base material of the glass optical fiber having a core portion and a cladding portion, by using a drawing device shown in FIG. 2. At this time, the glass optical fiber was cooled to a room temperature from a high temperature, and therefore roughness was formed on the surface of the glass optical fiber. Next, an inner layer with a thickness of 10 μm (Young's modulus at room temperature: 1.2 MPa) and an outer layer (Young's modulus: 0.5 MPa) were formed on the surface of the obtained glass optical fiber, so that an outer diameter of the primary layer composed of the inner layer and the outer layer was set to 187.5 μm. Then, a secondary layer (Young's modulus: 600 MPa) was formed on the surface of the outer layer of the primary layer, to thereby obtain a resin coated optical fiber according to the example 1 with an outer diameter of 250 μm. An ultraviolet ray crosslinkable urethane resin was used for the inner layer, the outer layer, and the secondary layer. Note that the Young's modulus at room temperature is also described as simply Young's modulus in the examples.

Comparative Example 1

A resin coated optical fiber of comparative example 1 has a two-layer resin coated structure shown in FIG. 10A, not having the inner layer of the primary layer of the example 1. According to the resin coated optical fiber of the comparative example 1, the primary layer of one layer (Young's modulus at room temperature: 0.5 MPa) was formed on the surface of the glass optical fiber having an outer diameter of 125 μm, so that an outer diameter was about 187.5 mm, and further a secondary layer (Young's modulus at room temperature: 600 MPa) was formed on the surface of the primary layer so that an outer diameter was 250 μm.

The transmission loss, long-term reliability, and UV-adhesion property were evaluated, for the resin coated optical fiber thus obtained. As the transmission loss, micro bending loss and increase of transmission loss by cabling were measured. The long-term reliability was evaluated by fracture strength obtained by a fracture test performed to the resin coated optical fiber after an accelerated deterioration test, and an average roughness on the surface of the glass optical fiber. Each case will be described hereafter.

(Evaluation of the Increase of Transmission Loss by Cabling and Micro Bending Loss)

In this specification, the micro bending loss means an increase amount of the loss when the resin coated optical fiber with a length of 400 m is wound by tensile force of 150 g on a bobbin with a drum diameter of 300 mm in which a sand paper of JIS#150 is laid on a surface. Further, the increase of transmission loss by cabling means an increase amount of the transmission loss before/after forming a cable by sequentially coating the surface of the resin coated optical fiber with press-winding, sheath, armor, and an anticorrosive layer.

Figure 5:
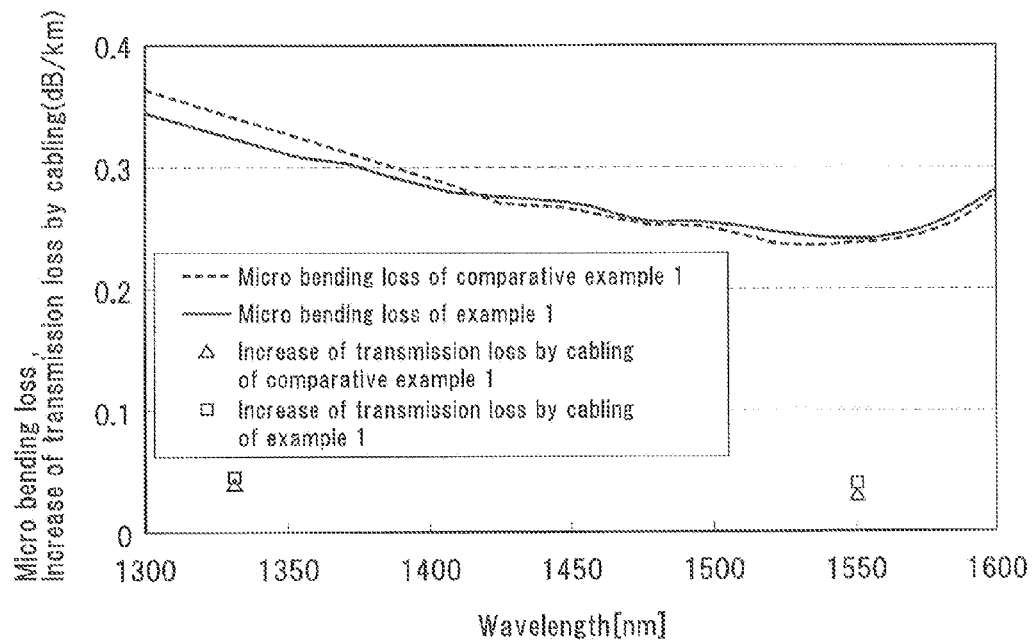
FIG. 5 is a view showing a relation between a wavelength of light transmitted through the resin coated optical fiber, and micro bending loss and increase of transmission loss by cabling.

FIG. 5 shows a measurement result obtained by measuring the micro bending loss and increase of transmission loss by cabling in each wavelength of the light transmitted through the resin coated optical fiber, regarding the resin coated optical fiber of the example 1 and the comparative example 1. The resin coated optical fiber with two-layer coated structure of the comparative example 1 is the resin coated optical fiber in which a countermeasure against the micro bending loss is taken. Meanwhile, the micro bending loss of the resin coated optical fiber with a three-layer structure of the example 1 was by no means inferior to the micro bending loss of the comparative example 1, and it was confirmed that the micro bending loss was suppressed to be sufficiently small. Further, regarding the increase of transmission loss by cabling as well, the example 1 was equal to the comparative example 1, and it was confirmed that the increase of transmission loss by cabling of the resin coated optical fiber of the example 1 could be made sufficiently small. Generally, the increase of transmission loss by cabling in the optical fiber for a long-distance communication is required to be 0.08 dB/km or less (when a wavelength is 1550 nm).

Next, a relation between the transmission loss (micro bending loss and increase of transmission loss by cabling) and the Young's modulus of the outer layer will be described by using FIG. 3 which shows a relation between the micro bending loss and the increase of transmission loss by cabling, and FIG. 4 which shows a relation between the Young's modulus of the outer layer and the micro bending loss. Note that diamond-shaped plots in FIG. 3 and FIG. 4 indicate data of the micro bending loss and the increase of transmission loss by cabling of the resin coated optical fiber in which the Young's modulus of the outer layer is variously changed (the Young's modulus is changed in a range of 0.4 to 1.0 MPa).

Figure 3:
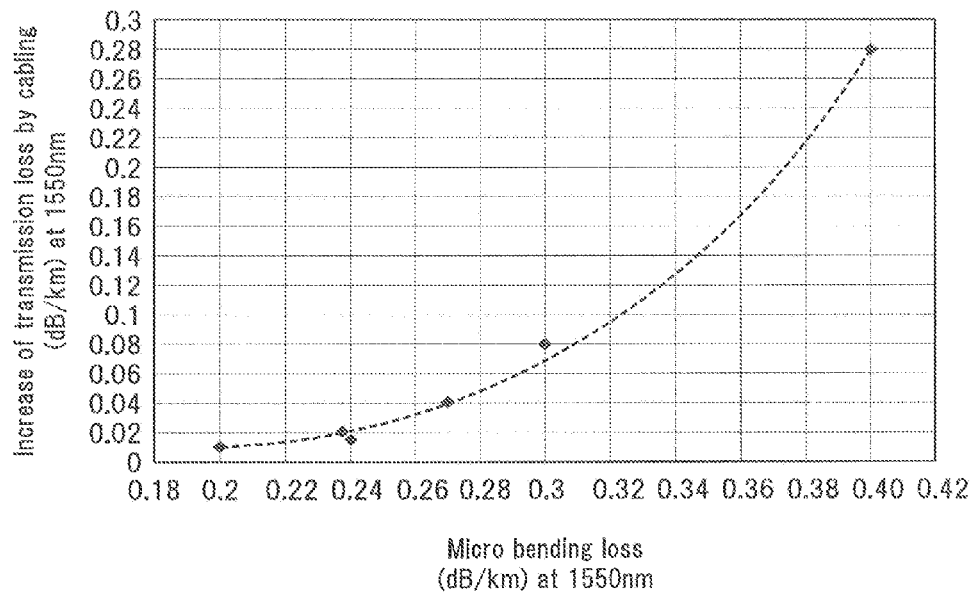
FIG. 3 is a view showing a relation between micro bending loss and increase of transmission loss by cabling.
Figure 4:
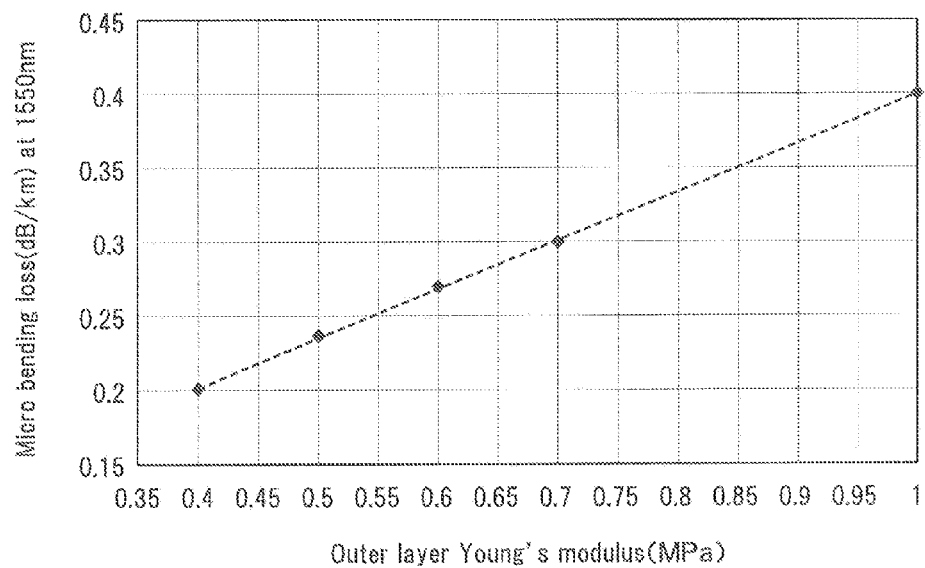
FIG. 4 is a view showing a relation between Young's modulus of an outer layer and the micro bending loss.

As shown in FIG. 3, the increase of transmission loss by cabling is decreased, with a decrease of the micro bending loss. The increase of transmission loss by cabling is required to be 0.08 dB/km or less as described above. In order to satisfy this value, as shown in FIG. 3, an increase of the micro bending loss may be set to 0.3 dB/km or less. Further, as shown in FIG. 4, the lower the Young's modulus of the outer layer is, the more relaxed and absorbed the external stress is. Therefore, the increase of the micro bending loss can be suppressed. As shown in FIG. 4, in order to set the micro bending loss to 0.3 dB/km or less, the Young's modulus of the outer layer may be set to 0.7 MPa or less. Accordingly, it is found that by setting the Young's modulus of the outer layer to 0.7 MPa or less, the micro bending loss can be set to 0.3 dB/km or less, and the increase of transmission loss by cabling can be suppressed to 0.08 dB/km or less.

(Evaluation of the Long-Term Reliability)

An acceleration test (called an accelerated deterioration test hereafter) was carried out under conditions of temperature: 85° C. and relative humidity: 85%, requiring 30 days, which can be given as a test for ensuring that glass corrosion should be within a prescribed allowable range in a long-term service life of 25 years, with a silane coupling agent used as an effective agent. The degree of the glass corrosion or the state of the fracture strength of the glass optical fiber to which the accelerated deterioration test is performed, is judged by the fracture test (based on a test method standard IEC60793-1-31 or TLA/ETA-455-28). The fracture test was carried out to the resin coated optical fiber after the accelerated deterioration test, and the fracture strength thereof was evaluated. The fracture state obtained by the fracture test was judged by a fracture strength median value (called Med value hereafter) of a Weibull fracture probability distribution, and and value (inclination between the fracture probability of a low strength distribution and the fracture strength). The Med value is the median value of the fracture strength in the Weibull fracture probability distribution of the fracture strength, and is an index of the fracture strength against the fracture of the glass optical fiber 1. The md value is a Weibull parameter, showing a state of the Weibull fracture probability distribution of the fracture strength.

Figure 6A:
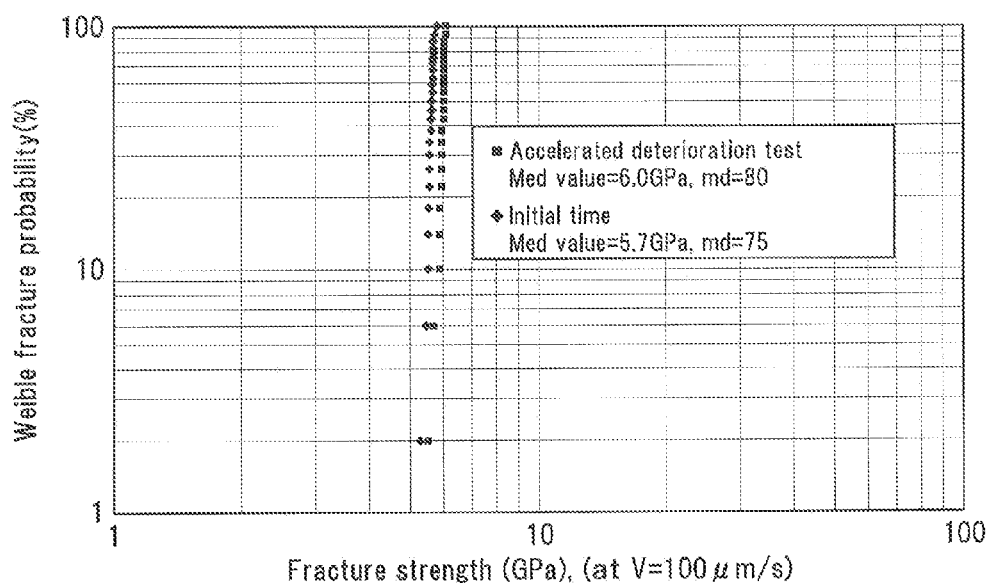
FIG. 6A is a view showing a relation between fracture strength and Weibull fracture probability according to example 1.

The fracture test (tension rate V) was carried out to the resin coated optical fiber of the example 1 after the accelerated deterioration test. As shown in FIG. 6A, a relation between the fracture strength and the Weibull fracture probability in the resin coated optical fiber of the example 1, was obtained from the fracture test. In FIG. 6A, when data of an initial state (diamond-shaped plots) and data after the accelerated deterioration test (rectangular plots) were compared, the deterioration obtained by the accelerated deterioration test was not confirmed in the resin coated optical fiber of the example 1. Further, the Med value obtained from the Weibull fracture probability was 5.7 GPa in the initial state, and 6.0 GPa after the accelerated deterioration test. Thus, the deterioration was not confirmed. Note that when the Med value of the fracture strength of the glass optical fiber is 5.5 GPa or more, it can be said that the glass optical fiber has sufficient fracture strength. Further, in the example 1, there was almost no change in the md value which was 75 (in the initial time) and 80 (after the accelerated deterioration test), and also there was almost no change in the state of the Weibull fracture probability distribution of the fracture strength. Therefore, reduction of the fracture strength due to deterioration was not recognized.

Figure 6B:
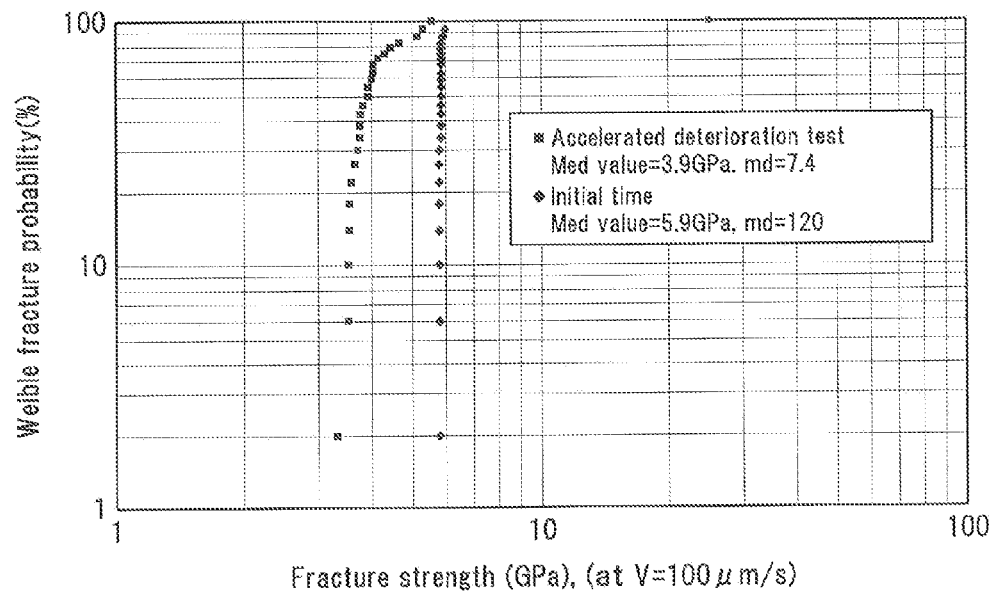
FIG. 6B is a view showing a relation between fracture strength and the Weibull fracture probability according to comparative example 1.

Meanwhile, according to FIG. 6B showing the relation between the fracture strength and the Weibull fracture probability in the resin coated optical fiber of the comparative example 1, deterioration was progressed and the Weibull fracture probability distribution was largely fluctuated, and the Med value was decreased to 3.9 GPa (after the accelerated deterioration test) from 5.9 GPa (initial time) in the comparative example 1. Further, in the comparative example 1, the md value was largely decreased to 7.4 (after the accelerated deterioration test) from 120 (initial time), and it was found that the fracture strength was largely reduced due to the deterioration. Note that a service life allowable laying length of the resin coated optical fiber with 10 mm diameter bending is 1 m or more, and therefore the md value is preferably 18 or more.

Next, an average roughness on the surface of the glass optical fiber after the accelerated deterioration test was measured. Specifically, the UV-resin layer of the resin coated optical fiber after the accelerated deterioration test was peeled off, and the glass optical fiber was exposed, to thereby measure the roughness on the surface of the exposed glass optical fiber with an Atomic Force Microscope (AFM) set in a non-contact mode. Then, arithmetic average roughness was calculated from scanned data, to thereby obtain average roughness. In the example 1, the average roughness after the accelerated deterioration test was 0.2 nm, and it was confirmed that there was almost no change from the initial state. Meanwhile, in the comparative example 1, the average roughness was increased to 1.4 nm.

Figure 7:
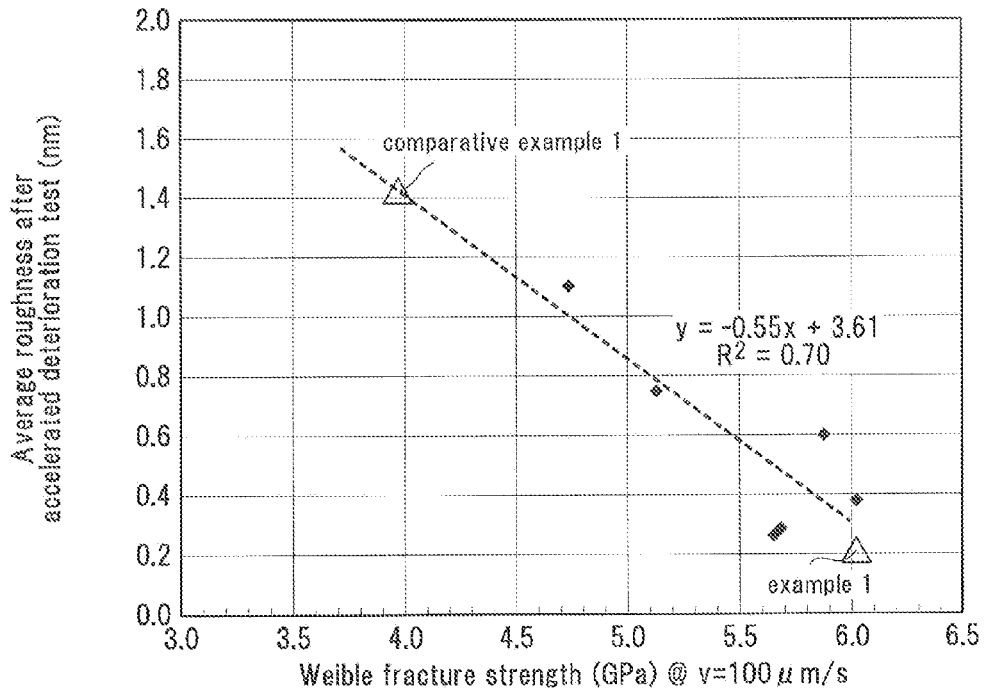
FIG. 7 is a view showing a relation between Med value and an average roughness after accelerated deterioration test.
Figure 8:
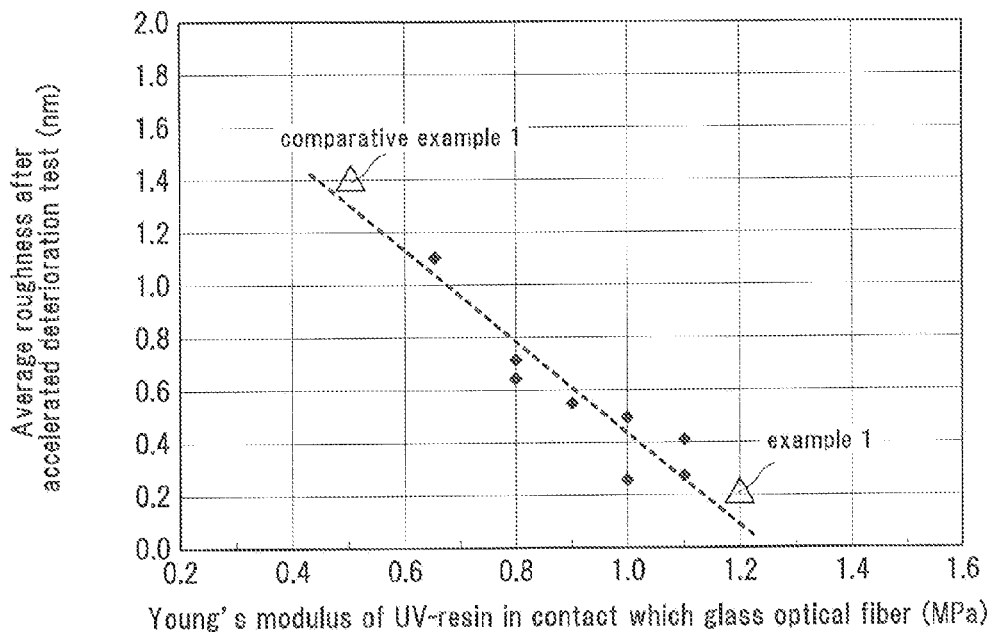
FIG. 8 is a view showing a relation between Young's modulus of UV-resin which is brought into contact with a glass optical fiber, and an average roughness after accelerated deterioration test.

Here, the relation between the average roughness and the Young's modulus of the UV-resin in contact with the glass optical fiber, will be described by using FIG. 7 which shows the relation between the Med value and the average roughness after the accelerated deterioration test, and FIG. 8 which shows the relation between the average roughness and the Young's modulus of the UV-resin in contact with the glass optical fiber. FIG. 7 shows a state that the Med value is decreased with the increase of the average roughness, and the fracture strength is reduced. Further, FIG. 8 shows a state that the average roughness after the accelerated deterioration test is reduced, with the increase of the Young's modulus of the UV-resin in contact with the glass optical fiber. The magnitude of the stress concentrated to the recess bottom portion of the roughness is different, between the example 1 in which the Young's modulus of the UV-resin in contact with the glass optical fiber is 1.2 MPa, and the comparative example 1 in which it is 0.5 MPa. Therefore, there is a difference in the increase of the average roughness due to deterioration. It is found from FIG. 7 and FIG. 8 and a result of example 3 as will be described later, that if the Young's modulus of the UV-resin in contact with the glass optical fiber is set to 0.9 MPa or more, the average roughness after the accelerated deterioration test can be suppressed to 0.6 nm or less, and the Med value is 5.5 GPa or more. Namely, even if the glass optical fiber in the resin coated optical fiber is deteriorated with elapse of time, it has sufficient fracture strength, provided that the average roughness is 0.6 nm or less. Note that in FIG. 7 and FIG. 8, triangular plots show data of the example 1 and the comparative example 1, and diamond plots show data obtained by variously changing the Young's modulus of the UV-resin in contact with the glass optical fiber in the comparative example 1.

(Adhesion Property of the UV-Resin)

Figure 9A:
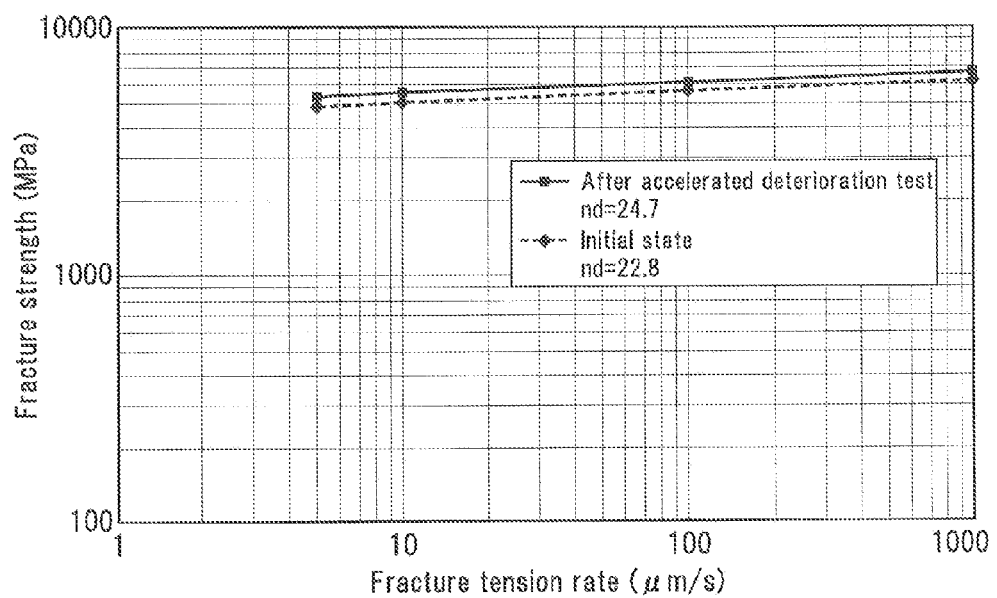
FIG. 9A is a view showing a relation between fracture tension rate and fracture strength according to example 1.
Figure 9B:
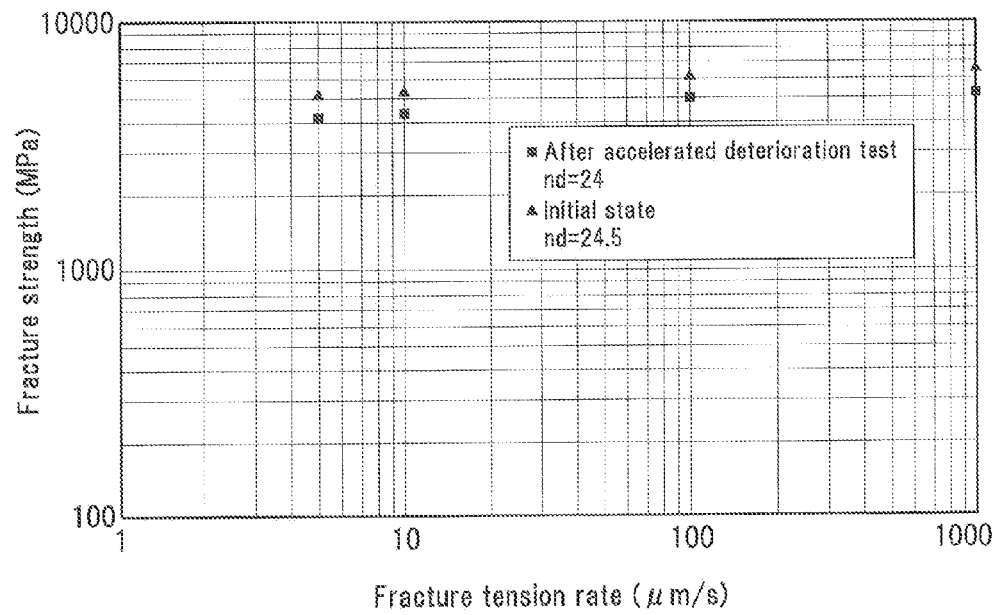
FIG. 9B is a view showing a relation between the fracture tension rate and the fracture strength according to comparative example 1.

A bonding state (adhesion property) between the glass optical fiber and the UV-resin in contact with the glass optical fiber, was determined by nd value, being a dynamic fatigue constant showing a glass corrosion rate. The nd value does not show the increase of the roughness which is accelerated by the stress added to the recess bottom portion on the surface of the glass optical fiber. However, an acceleration rate of the glass corrosion can be determined by the nd value. The nd value can be calculated, for example, from a fracture tension rate at four points, and the inclination of a logarithm display graph obtained from the fracture strength at that time, as shown in FIG. 9A and FIG. 9B which show the relation between the fracture tension rate and the fracture strength. It was found from the accelerated deterioration test, that the nd value obtained from the accelerated (deterioration test was varied from 22.8 to 24.7 in the example 1 shown in FIG. 9A, and the nd value was varied from 24.5 to 24 in the comparative example 1 shown in FIG. 9B. It was also confirmed from this result, that the variation of the nd value was small in both the example 1 and the comparative example 1, and the adhesion property of the UV-resin was not reduced.

The aforementioned results are summarized as follows. As shown in table 1, according to the example 1, the micro bending loss was 0.24 d dB/km, the increase of transmission loss by cabling was 0.04 dB/km, the Med value after the accelerated deterioration test was 6.0 GPa, the md value was 80, and the average roughness was 0.2 nm, when the wavelength was 1550 nm. Namely, it is found that the resin coated optical fiber of the example 1 has an advantage of suppressing the increase of the micro bending loss and the increase of transmission loss by cabling, and having excellent long-term reliability with less deterioration of the fracture strength, etc.

Meanwhile, according to the comparative example 1, the micro bending loss was 0.24 dB/km, the increase of transmission loss by cabling was 0.03 dB/km, the Med value was 3.9, the and value was 7.4, and the average roughness was 1.4 nm. Although the increase of the transmission loss can be suppressed by the resin coated optical fiber of the comparative example 1, the fracture of the glass optical fiber or the glass corrosion can not be sufficiently suppressed, and the long-term reliability is reduced. This is because the concentration of the external stress added to the recess bottom portion of the glass optical fiber can not be suppressed by the primary layer of one layer with low Young's modulus, and fracture occurs and the corrosion of the glass optical fiber is accelerated.

Examples 2 to 4, Comparative Examples 2, 3

The resin coated optical fiber of examples 2 to 4, comparative example 2, and comparative example 3 is respectively formed almost similarly to the example 1 and the comparative example 1 (A different point between the example 1 and the comparative example 1 will be described hereafter), and the same evaluation as described above was performed. Evaluation results are summarized in the table 1, together with the example 1 and the comparative example 1. Each case will be described hereafter.

Example 2

According to the example 2, a different point from the example 1 is simply that the Young's modulus of the secondary layer is changed to 1200 MPa, and the other structure is formed similarly to the example 1. As shown in the table 1, according to the example 2, the long-term reliability is excellent even after the accelerated deterioration test is carried out in the same way as the example 1, and the micro bending loss and the increase of transmission loss by cabling are suppressed to be sufficiently small.

Example 3

According to the example 3, the Young's modulus of the inner layer of the example 1 is changed to 0.9 MPa, and the Young's modulus of the outer layer of the example 1 is changed to 0.7 MPa. From the table 1, it is found that decrease of the Med value after the accelerated deterioration test is not confirmed and the average roughness after the accelerated deterioration test is suppressed to 0.6 nm, and a sufficient fracture strength is exhibited. Note that the md value is decreased to 25 from 100, which is obtained by the accelerated deterioration test. However, there is no problem because the md value is 18 or more. Further, the micro bending loss and the increase of transmission loss by cabling are sufficiently small.

Example 4

According to example 4, the Young's modulus of the inner layer of the example 1 is changed to 3.0, and the Young's modulus of the outer layer of the example 1 is changed to 0.7 MPa. From the table 1, it is found that the micro bending loss is 0.30 dB/km and the increase of transmission loss by cabling is 0.08 dB/km, which comply with an acceptability criterion. Further, it is found that the Med value and the md value are not decreased even after the accelerated deterioration test is carried out, and the average roughness after the accelerated deterioration test is 0.15 nm, and the long-term reliability is excellent.

Comparative Example 2

According to the comparative example 2, a different point from the comparative example 1 is simply that the Young's modulus of the secondary layer is changed to 1200 MPa. Evaluation results are as follows. Namely, similarly to the comparative example 1, although the micro bending loss and the increase of transmission loss by cabling can be suppressed, the Med value and the and value obtained by the accelerated deterioration test are largely decreased from 5.9 to 3.9, and from 120 to 7.4 respectively, and the average roughness after the accelerated deterioration test is increased to 1.4 nm. According to the comparative example 2, it is confirmed that similarly to the comparative example 1, the fracture or the glass corrosion of the glass optical fiber can not be suppressed and the long-term reliability is low.

Comparative Example 3

According to the comparative example 3, the Young's modulus of the primary layer of the comparative example 1 is changed to 1.0 MPa, and the Young's modulus of the secondary layer of the comparative example 1 is changed to 1200 MPa. As shown in the table 1, according to the comparative example 3, the average roughness after the accelerated deterioration test is 0.5 nm, and the Med value and the and value after the accelerated deterioration test are not decreased. Therefore, it is confirmed that fracture or corrosion of the glass optical fiber is suppressed. However, regarding the transmission loss, it is confirmed that the micro bending loss is 0.4 d B/km, and the increase of transmission loss by cabling is 0.28 d B/km, which are not suitable for a long-term communication transmission. This is because the Young's modulus of the UV-resin layer (primary layer) in contact with the glass optical fiber is set to be relatively large, and therefore the concentration of the external stress added to the recess portion on the surface of the glass optical fiber and the glass corrosion can be suppressed, but the external stress itself can not be completely relaxed, due to high Young's modulus of the primary layer, and the transmission loss such as micro bending loss can not be suppressed.

TABLE 1

|  |  | Example 1 | Example 2 | Example 3 | Example 4 | Comparative example 1 | Comparative example 2 | Comparative example 3 |
|---|---|---|---|---|---|---|---|---|
| Young's modulus (MPa) of inner layer | | 1.2 | 1.2 | 0.9 | 3.0 | Inner layer none | Inner layer none | Inner layer none |
| Young's modulus (MPa) of outer layer or primary layer | | 0.5 | 0.5 | 0.7 | 0.7 | 0.5 | 0.5 | 1.0 |
| Young's modulus (MPa) of secondary layer | | 600 | 1200 | 600 | 600 | 600 | 1200 | 1200 |
| Micro bending loss (dB/km) | | 0.24 | 0.24 | 0.27 | 0.30 | 0.24 | 0.23 | 0.4 |
| Cable increase loss (dB/km) | | 0.04 | 0.015 | 0.04 | 0.08 | 0.03 | 0.02 | 0.28 |
| Med value (Gpa) | Initial time | 5.7 | 5.7 | 5.5 | 5.7 | 5.9 | 5.9 | 5.7 |
|  | After deterioration test | 6.0 | 6.0 | 5.7 | 6.0 | 3.9 | 3.9 | 5.8 |
| md value | Initial time | 75 | 75 | 100 | 72 | 120 | 120 | 88 |
|  | After deterioration test | 80 | 80 | 25 | 85 | 7.4 | 7.4 | 95 |
| nd value | Initial time | 22.8 | 22.8 | 22.0 | 22.5 | 24.5 | 24.5 | 21.0 |
|  | After deterioration test | 24.7 | 24.7 | 20.2 | 24.2 | 24 | 24.0 | 22.5 |
| Average roughness (nm) | | 0.2 | 0.26 | 0.6 | 0.15 | 1.4 | 1.4 | 0.5 |
| Generalized pass/failure decision | | Pass | Pass | Pass | Pass | Failure | Failure | Failure |

Standard of pass/failure decision
(1) Med value: 5.5 GPa or more
(2) and value: 18 or more
(3) Average roughness: 0.6 nm or less
(4) Increase of transmission loss by cabling: 0.08 dB/km or less

What is claimed is:

1. A resin-coated optical fiber, comprising at least:
a glass optical fiber composed of a core and a clad for coating the core;
a primary layer made of UV-curing resin in contact with the glass optical fiber; and
a secondary layer made of UV-curing resin disposed on an outer periphery of the primary layer,
wherein the primary layer has a two-layer structure of an inner layer directly in contact with a surface of the clad, and an outer layer for coating the inner layer,
wherein a Young's modulus of the UV-curing resin of the inner layer is higher than a Young's modulus of the UV-curing resin of the outer layer, and the Young's modulus of the UV-curing resin of the secondary layer is higher than the Young's modulus of the UV-curing resin of the inner layer,
wherein a film thickness of the inner layer is 10 μm or less, the film thickness of the inner layer larger than a depth of a recess portion formed on a surface of the clad when the glass optical fiber is drawn,
wherein the UV-curing resin of the inner layer has a Young's modulus of 0.9 MPa or more and 3.0 MPa or less at room temperature in a film state based on JIS standard K7113, and the UV-curing resin of the outer layer has a Young's modulus of 0.1 MPa or more and 0.7 MPa or less at room temperature in a film state based on JIS standard K7113, and
wherein the UV-curing resin of the secondary layer has a Young's modulus of 600 MPa or more at room temperature in a film state based on JIS standard K7113.

2. The resin-coated optical fiber according to claim 1, wherein an outer diameter of the primary layer is 180 μm or more and 210 μm or less.

3. The resin-coated optical fiber according to claim 1, wherein an average roughness on a surface of the clad in the resin-coated optical fiber is 0.6 nm or less after an accelerated deterioration test performed under conditions of temperature: 85° C. and relative humidity: 85%, requiring 30 days.

4. A resin-coated optical fiber, comprising at least:
a glass optical fiber composed of a core and a clad for coating the core;
a first layer made of UV-curing resin directly in contact with the clad of the glass optical fiber;
a second layer made of UV-curing resin coating the first layer; and
a third layer made of UV-curing resin coating the second layer,
wherein a film thickness of the first layer is 10 μm or less,
wherein a Young's modulus of the UV-curing resin of the first layer at room temperature in a film state based on JIS standard K7113 is 0.9 MPa or more and 3.0 MPa or less, a Young's modulus of the UV-curing resin of the second layer at room temperature in a film state based on JIS standard K7113 is 0.1 MPa or more and 0.7 MPa or less, and a Young's modulus of the UV-curing resin of the third layer at room temperature in a film state based on JIS standard K7113 is 600 MPa or more.

5. The resin-coated optical fiber according to claim 1, wherein the UV-curing resin of the inner layer includes a silane-coupling agent.

6. The resin-coated optical fiber according to claim 4, wherein the UV-curing resin of the first layer includes a silane-coupling agent.

7. The resin-coated optical fiber according to claim 4, further comprising a fourth layer made of UV-curing resin interposed between the second layer and the third layer, the fourth layer having a different Young's modulus than the Young's modulus of the third layer and a Young's modulus of the first layer.

8. The resin-coated optical fiber according to claim 4, further comprising a fourth layer made of a UV-curing resin coating the third layer, the fourth layer having a different Young's modulus than the Young's modulus of the third layer.

* * * * *